US012756234B2

(12) United States Patent
Slatnick et al.

(10) Patent No.: US 12,756,234 B2
(45) Date of Patent: Oct. 6, 2026

(54) SWINGING COILS IN MULTI-COIL WIRELESS CHARGERS

(71) Applicant: AIRA, INC., Chandler, AZ (US)

(72) Inventors: Jake Slatnick, San Diego, CA (US); Eric Heindel Goodchild, Phoenix, AZ (US); John Winters, Chandler, AZ (US); Magne Nerheim, Paradise Valley, AZ (US)

(73) Assignee: AIRA, INC., Chandler, AZ (US)

( * ) Notice: Subject to any disclaimer, the term of this patent is extended or adjusted under 35 U.S.C. 154(b) by 1094 days.

(21) Appl. No.: 17/790,903

(22) PCT Filed: Jan. 4, 2021

(86) PCT No.: PCT/US2021/012107

§ 371 (c)(1),
(2) Date: Jul. 5, 2022

(87) PCT Pub. No.: WO2021/141864

PCT Pub. Date: Jul. 15, 2021

(65) Prior Publication Data

US 2023/0023485 A1 Jan. 26, 2023

Related U.S. Application Data

(60) Provisional application No. 62/957,432, filed on Jan. 6, 2020.

(51) Int. Cl.
*H02J 50/12* (2016.01)
*H02J 7/00* (2006.01)

(52) U.S. Cl.
CPC .............. *H02J 50/12* (2016.02); *H02J 7/875* (2026.01)

(58) Field of Classification Search
CPC ....................................................... H02J 50/12
(Continued)

(56) References Cited

U.S. PATENT DOCUMENTS 6,844,702 B2 1/2005 Giannopoulos et al.
2006/0202665 A1 9/2006 Hsu
(Continued)

FOREIGN PATENT DOCUMENTS

CN 108282018 A 7/2018
WO 2008002164 A1 1/2008
WO 2019051022 A1 3/2019

OTHER PUBLICATIONS

Corresponding EP Application No. 21738130.0. Extended Search Report (Feb. 21, 2024).
(Continued)

*Primary Examiner* — Yalkew Fantu
(74) *Attorney, Agent, or Firm* — Loza & Loza, LLP; Anthony Smyth

(57) ABSTRACT

Systems, methods and apparatus for wireless charging are disclosed. A wireless charging device has a first plurality of charging coils provided at a charging surface of the wireless charging device, and a controller. The controller may be configured to determine that a chargeable device is positioned proximate to a plurality of charging coils provided in a charging surface, decouple a first charging coil in the plurality of charging coils from a first driver circuit, couple the first charging coil to a second driver circuit, where a second charging coil in the plurality of charging coils may be coupled to the second driver circuit, and configure the charging current supplied by the second driver circuit to cause the first charging coil and the second charging coil to transfer a desired power level to the chargeable device.

17 Claims, 15 Drawing Sheets

(58) Field of Classification Search
USPC .......................................................... 320/128
See application file for complete search history.

(56) References Cited

U.S. PATENT DOCUMENTS

| | | | | |
|---|---|---|---|---|
| 2012/0313577 | A1 | 12/2012 | Moes et al. | |
| 2014/0139178 | A1* | 5/2014 | Large ...................... | H02J 50/90 320/108 |
| 2014/0364688 | A1* | 12/2014 | Wilson ............... | A61B 1/00013 600/102 |
| 2015/0180284 | A1* | 6/2015 | Kang ...................... | H04W 4/80 307/104 |
| 2016/0134154 | A1* | 5/2016 | Baarman ............... | H02J 50/402 320/108 |
| 2019/0312452 | A1* | 10/2019 | Chen ..................... | H02J 50/402 |

OTHER PUBLICATIONS

PCT/US2021/012107. International Search Report & Written Opinion (Mar. 24, 2021).

* cited by examiner

400

SWINGING COILS IN MULTI-COIL WIRELESS CHARGERS

PRIORITY CLAIM

This application is the U.S. National Stage of International Patent Application No. PCT/US2021/012107 filed on Jan. 4, 2021, which claims priority to and the benefit of provisional patent application No. 62/957,432 filed in the United States Patent Office on Jan. 6, 2020, the entire content of these applications being incorporated herein by reference as if fully set forth below in its entirety and for all applicable purposes.

TECHNICAL FIELD

The present invention relates generally to wireless charging of batteries, including the use of a multi-coil wireless charging device to charge batteries in mobile devices regardless of location of the mobile devices on a surface of the multi-coil wireless charging device.

BACKGROUND

Wireless charging systems have been deployed to enable certain types of devices to charge internal batteries without the use of a physical charging connection. Devices that can take advantage of wireless charging include mobile processing and/or communication devices. Standards, such as the Qi standard defined by the Wireless Power Consortium enable devices manufactured by a first supplier to be wirelessly charged using a charger manufactured by a second supplier. Standards for wireless charging are optimized for relatively simple configurations of devices and tend to provide basic charging capabilities.

Improvements in wireless charging capabilities are required to support continually increasing complexity of mobile devices and changing form factors. For example, there is a need for improved charging techniques for multi-coil, multi-device charging pads.

DETAILED DESCRIPTION

Figure 1:
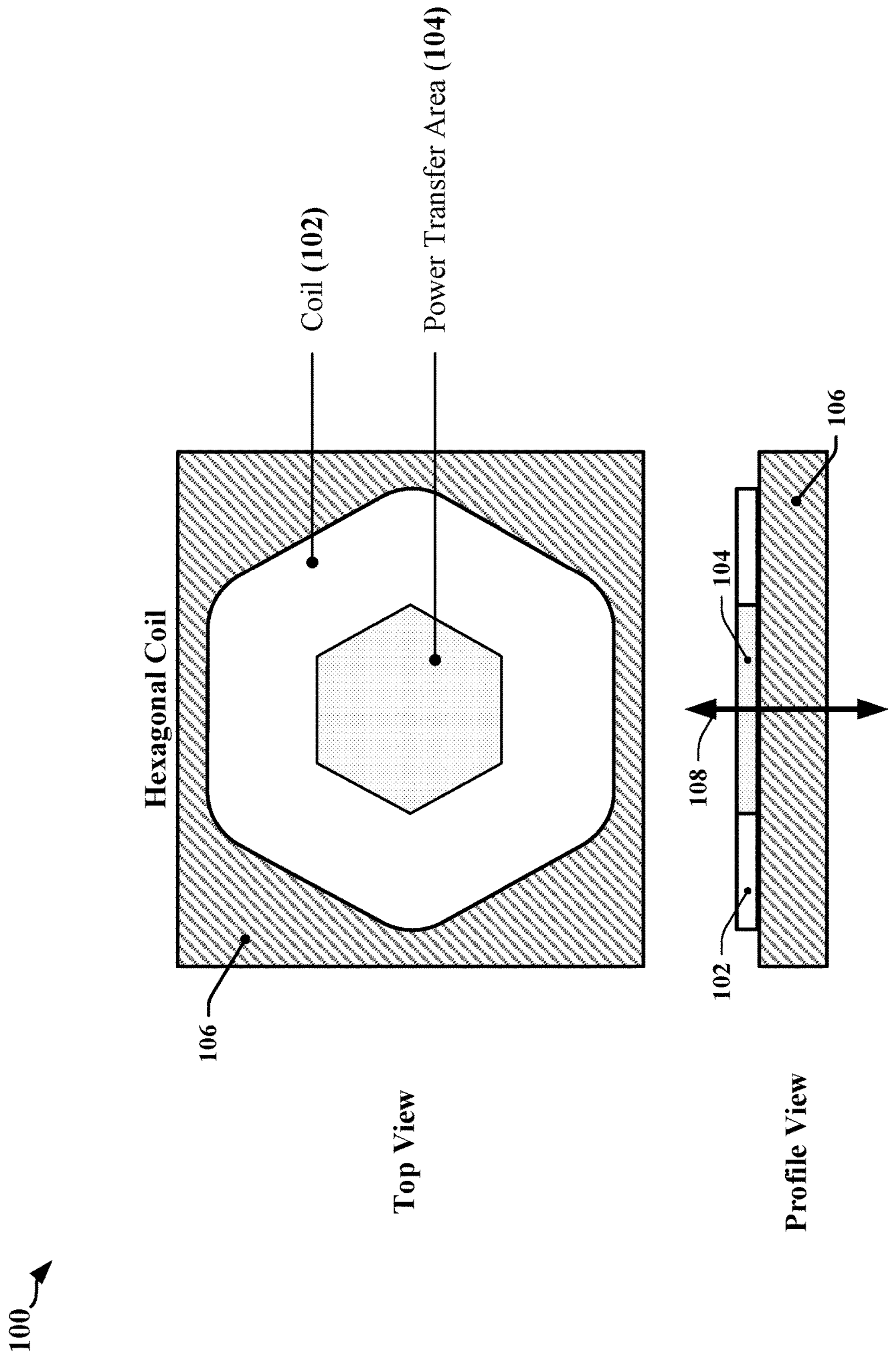
FIG. 1 illustrates an example of a charging cell that may be employed to provide a charging surface in a wireless charging device in accordance with certain aspects disclosed herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of wireless charging systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a processor-readable storage medium. A processor-readable storage medium, which may also be referred to herein as a computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), Near Field Communications (NFC) token, random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Overview

Certain aspects of the present disclosure relate to systems, apparatus and methods applicable to wireless charging devices that provide a free-positioning charging surface that has multiple transmitting coils or that can concurrently charge multiple receiving devices. In one aspect, a controller in the wireless charging device can locate a device to be charged and can configure one or more transmitting coils optimally positioned to deliver power to the receiving device. Charging cells may be provisioned or configured with one or more inductive transmitting coils and multiple charging cells may be arranged or configured to provide the charging surface. The location of a device to be charged may be detected through sensing techniques that associate location of the device to changes in a physical characteristic centered at a known location on the charging surface. In some examples, sensing of location may be implemented using capacitive, resistive, inductive, touch, pressure, load, strain, and/or another appropriate type of sensing.

Certain aspects disclosed herein relate to improved wireless charging techniques. Systems, apparatus and methods are disclosed that accommodate free placement of chargeable devices on a surface of a multi-coil wireless charging device. Certain aspects can improve the efficiency and capacity of wireless power transmission to a receiving device. In one example, a wireless charging apparatus has a battery charging power source, a plurality of charging cells configured in a matrix, a first plurality of switches in which each switch is configured to couple a row of coils in the matrix to a first terminal of the battery charging power source, and a second plurality of switches in which each switch is configured to couple a column of coils in the matrix to a second terminal of the battery charging power source. Each charging cell in the plurality of charging cells may include one or more coils surrounding a power transfer area. The plurality of charging cells may be arranged adjacent to a charging surface without overlap of power transfer areas of the charging cells in the plurality of charging cells.

In one aspect of the disclosure, an apparatus has a battery-charging power source and a plurality of charging cells, where a controller can select and couple each charging cell to the power source as needed or desired. Each charging cell in the plurality of charging cells may include one or more coils surrounding a power transfer area. The plurality of charging cells may be arranged adjacent to a charging surface without overlap of power transfer areas of the charging cells.

Certain aspects of the present disclosure relate to systems, apparatus and methods for wireless charging using stacked coils that can charge targeted devices presented to a wireless charging device without a requirement to match a particular geometry or location within a charging surface of the wireless charging device. Each coil may have a shape that is substantially polygonal. In one example, each coil may have a hexagonal shape. Each coil may be implemented using wires, printed circuit board traces and/or other connectors that are provided in a spiral. Each coil may span two or more layers separated by an insulator or substrate such that coils in different layers are centered around a common axis.

According to certain aspects disclosed herein, power can be wirelessly transferred to a receiving device located anywhere on a charging surface that can have an arbitrarily defined size or shape without regard to any discrete placement locations enabled for charging. Multiple devices can be simultaneously charged on a single charging surface. The charging surface may be manufactured using printed circuit board technology, at low cost and/or with a compact design.

Charging Cells

Certain aspects of the present disclosure relate to systems, apparatus and methods applicable to wireless charging devices that provide a free-positioning charging surface that has multiple transmitting coils or that can concurrently charge multiple receiving devices. In one aspect, a processing circuit coupled to the free-positioning charging surface can be configured to locate a device to be charged and can select and configure one or more transmitting coils that are optimally positioned to deliver power to the receiving device. Charging cells may be configured with one or more inductive transmitting coils and multiple charging cells may be arranged or configured to provide the charging surface. The location of a device to be charged may be detected through sensing techniques that associate location of the device to changes in a physical characteristic centered at a known location on the charging surface. In some examples, sensing of location may be implemented using capacitive, resistive, inductive, touch, pressure, load, strain, and/or another appropriate type of sensing.

According to certain aspects disclosed herein, a charging surface in a wireless charging device may be provided using charging cells that are deployed adjacent to the charging surface. In one example the charging cells are deployed in accordance with a honeycomb packaging configuration. A charging cell may be implemented using one or more coils that can each induce a magnetic field along an axis that is substantially orthogonal to the charging surface adjacent to the coil. In this disclosure, a charging cell may refer to an element having one or more coils where each coil is configured to produce an electromagnetic field that is additive with respect to the fields produced by other coils in the charging cell and directed along or proximate to a common axis. In this description, a coil in a charging cell may be referred to as a charging coil or a transmitting coil.

In some examples, a charging cell includes coils that are stacked along a common axis. One or more coils may overlap such that they contribute to an induced magnetic field substantially orthogonal to the charging surface. In some examples, a charging cell includes coils that are arranged within a defined portion of the charging surface and that contribute to an induced magnetic field within the defined portion of the charging surface, the magnetic field contributing to a magnetic flux flowing substantially orthogonal to the charging surface. In some implementations, charging cells may be configurable by providing an activating current to coils that are included in a dynamically-defined charging cell. For example, a wireless charging device may include multiple stacks of coils deployed across a charging surface, and the wireless charging device may detect the location of a device to be charged and may select some combination of stacks of coils to provide a charging cell adjacent to the device to be charged. In some instances, a charging cell may include, or be characterized as a single coil. However, it should be appreciated that a charging cell may include multiple stacked coils and/or multiple adjacent coils or stacks of coils.

FIG. 1 illustrates an example of a charging cell 100 that may be deployed or configured to provide a charging surface in a wireless charging device. In this example, the charging cell 100 has a substantially hexagonal shape that encloses one or more coils 102 constructed using conductors, wires or circuit board traces that can receive a current sufficient to produce an electromagnetic field in a power transfer area 104. In various implementations, some coils 102 may have a shape that is substantially polygonal, including the hexagonal charging cell 100 illustrated in FIG. 1. Other implementations may include or use coils 102 that have other shapes. The shape of the coils 102 may be determined at least in part by the capabilities or limitations of fabrication technology or to optimize layout of the charging cells on a substrate 106 such as a printed circuit board substrate. Each coil 102 may be implemented using wires, printed circuit board traces and/or other connectors in a spiral configuration. Each charging cell 100 may span two or more layers separated by an insulator or substrate 106 such that coils 102 in different layers are centered around a common axis 108.

Figure 2:
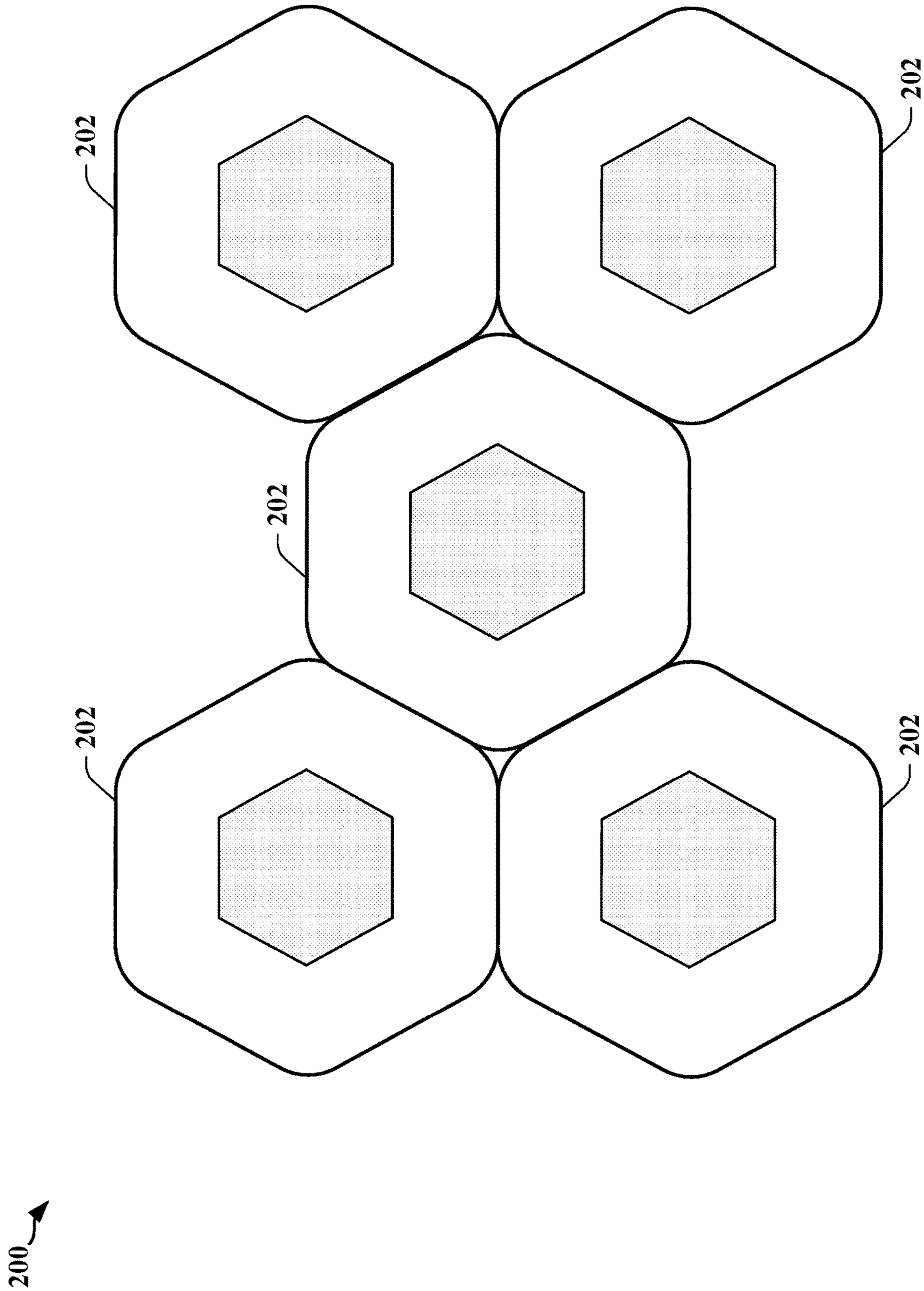
FIG. 2 illustrates an example of an arrangement of charging cells provided on a single layer of a segment of a charging surface in a wireless charging device that may be adapted in accordance with certain aspects disclosed herein.

FIG. 2 illustrates an example of an arrangement 200 of charging cells 202 provided on a single layer of a segment or portion of a charging surface that may be adapted in accordance with certain aspects disclosed herein. The charging cells 202 are arranged according to a honeycomb packaging configuration. In this example, the charging cells 202 are arranged end-to-end without overlap. This arrangement can be provided without through-holes or wire interconnects. Other arrangements are possible, including arrangements in which some portion of the charging cells 202 overlap. For example, wires of two or more coils may be interleaved to some extent.

Figure 3:
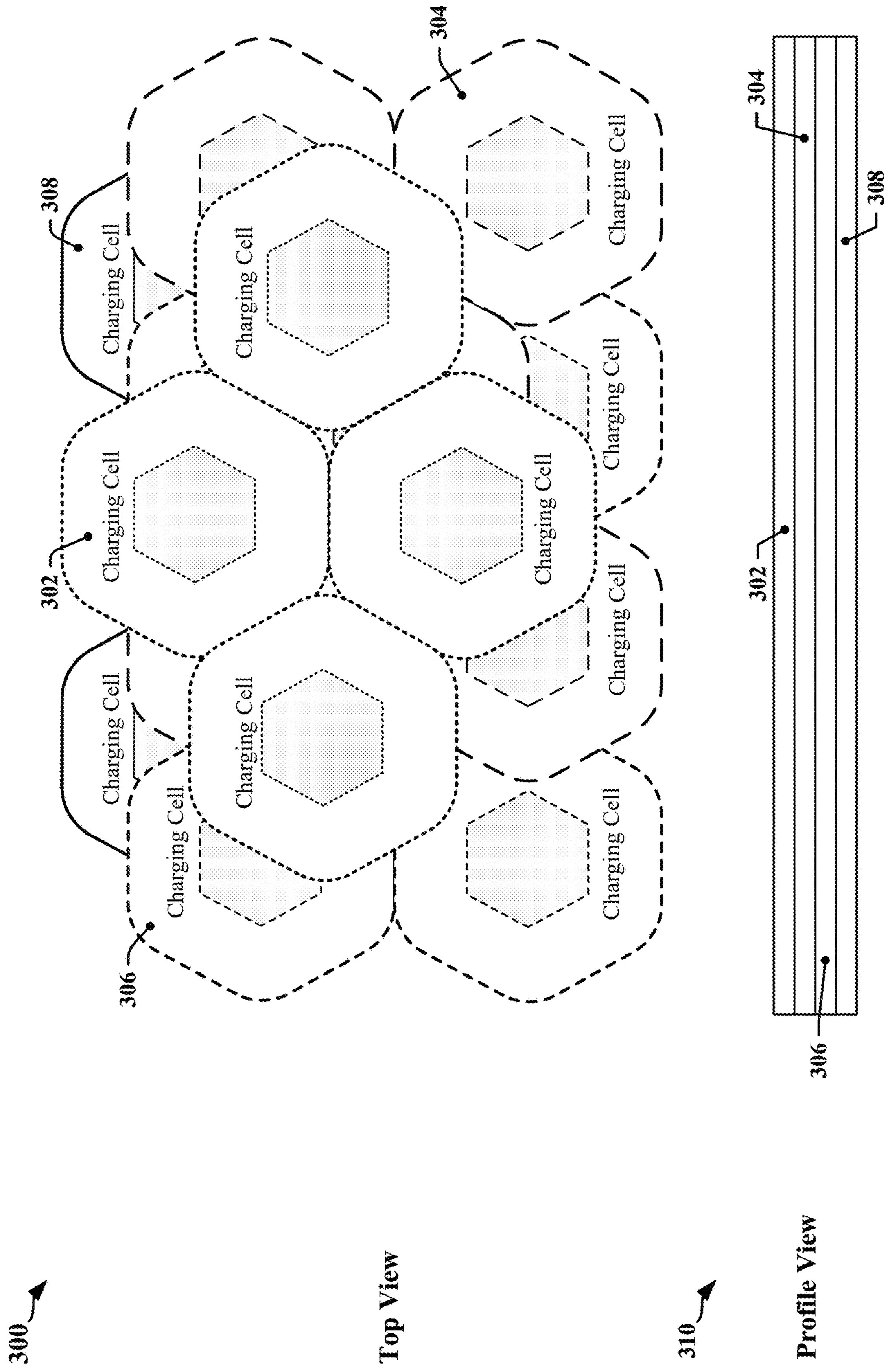
FIG. 3 illustrates an example of an arrangement of charging cells when multiple layers are overlaid within a segment of a charging surface that may be adapted in accordance with certain aspects disclosed herein.

FIG. 3 illustrates an example of an arrangement of charging cells from two perspectives 300, 310 when multiple layers are overlaid within a segment or portion of a charging surface that may be adapted in accordance with certain aspects disclosed herein. Layers of charging cells 302, 304, 306, 308 are provided within the charging surface. The charging cells within each layer of charging cells 302, 304, 306, 308 are arranged according to a honeycomb packaging configuration. In one example, the layers of charging cells 302, 304, 306, 308 may be formed on a printed circuit board that has four or more layers. The arrangement of charging cells 100 can be selected to provide complete coverage of a designated charging area that is adjacent to the illustrated segment.

Figure 4:
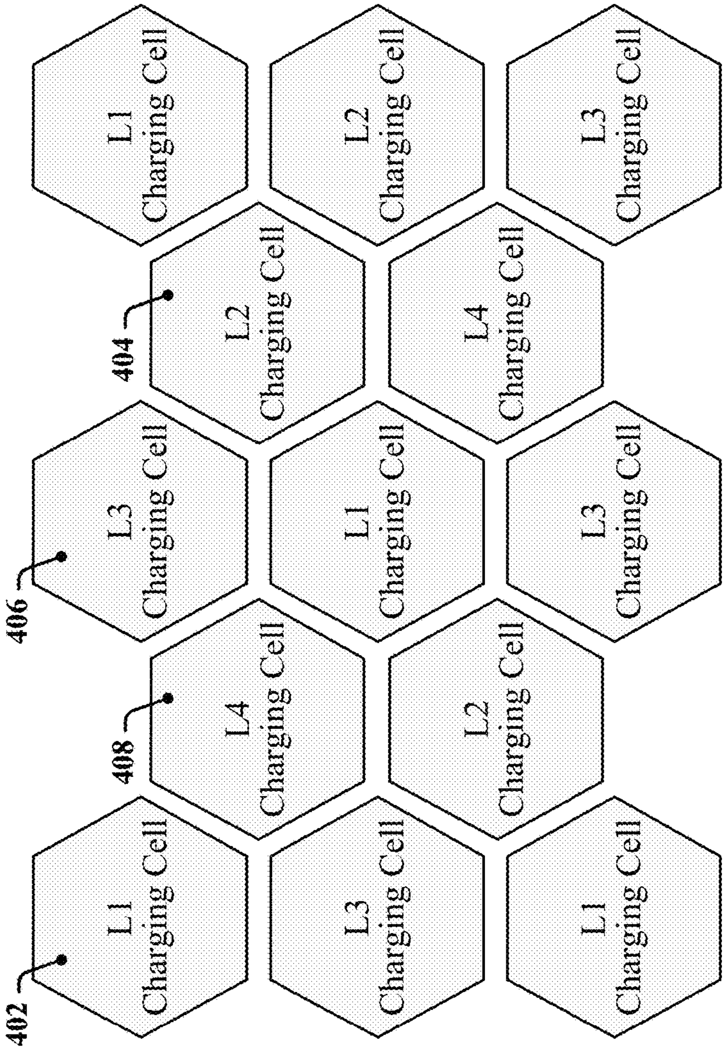
FIG. 4 illustrates the arrangement of power transfer areas provided by a charging surface that employs multiple layers of charging cells configured in accordance with certain aspects disclosed herein.

FIG. 4 illustrates the arrangement of power transfer areas provided in a charging surface 400 that employs multiple layers of charging cells configured in accordance with certain aspects disclosed herein. The illustrated charging surface is constructed from four layers of charging cells 402, 404, 406, 408. In FIG. 4, each power transfer area provided by a charging cell in the first layer of charging cells 402 is marked "L1", each power transfer area provided by a charging cell in the second layer of charging cells 404 is marked "L2", each power transfer area provided by a charging cell in the third layer of charging cells 406 is marked "L3", and each power transfer area provided by a charging cell in the fourth layer of charging cells 408 is marked "L4".

Wireless Transmitter

Figure 5:
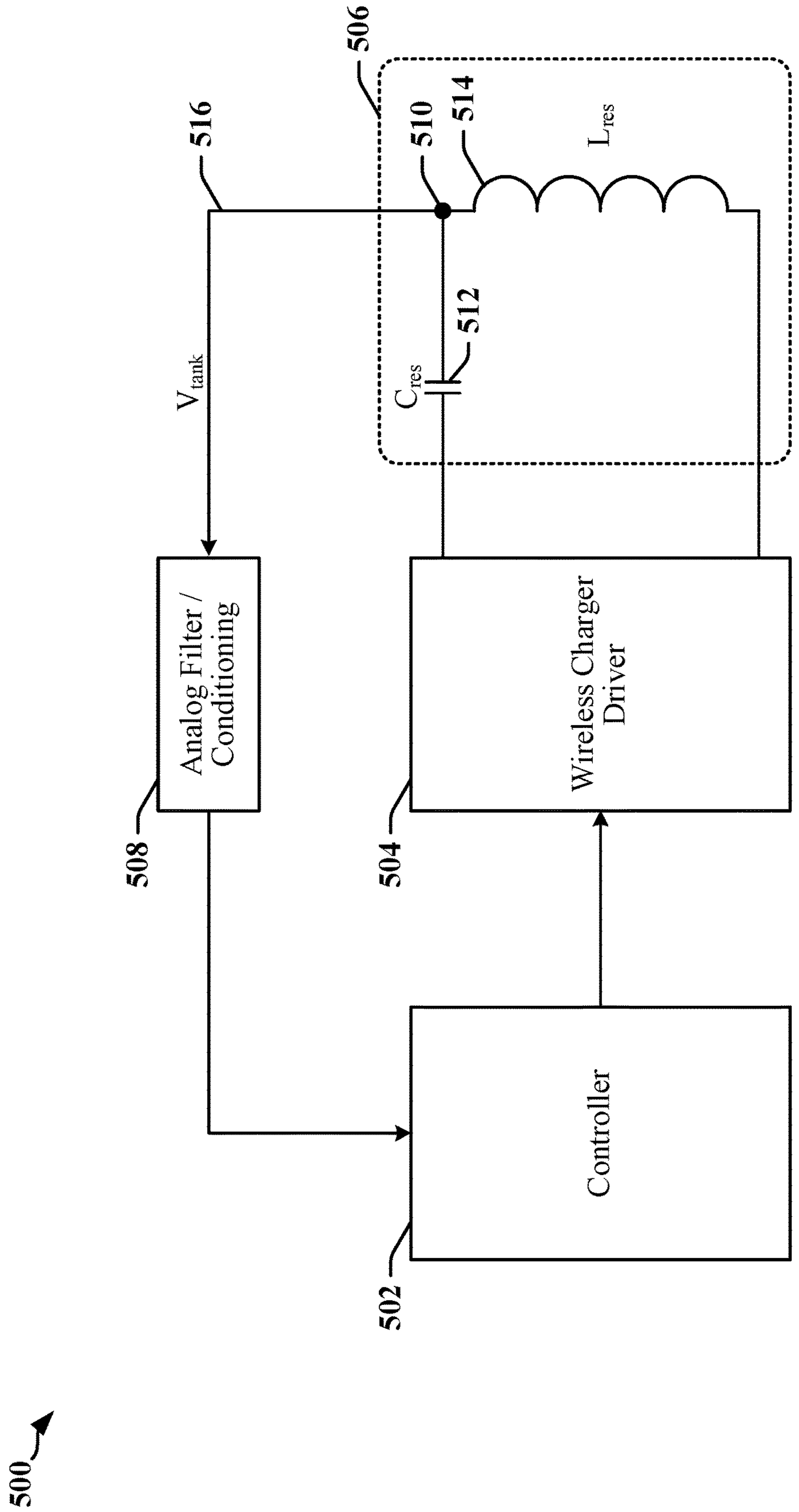
FIG. 5 illustrates a wireless transmitter that may be provided in a charger base station in accordance with certain aspects disclosed herein.

FIG. 5 illustrates an example of a wireless transmitter 500 that can be provided in a base station of a wireless charging device. A base station in a wireless charging device may include one or more processing circuits used to control operations of the wireless charging device. A controller 502 may receive a feedback signal filtered or otherwise processed by a filter circuit 508. The controller may control the operation of a driver circuit 504 that provides an alternating current to a resonant circuit 506. In some examples, the controller 502 may generate a digital frequency reference signal used to control the frequency of the alternating current output by the driver circuit 504. In some instances, the digital frequency reference signal may be generated using a programmable counter or the like. In some examples, the driver circuit 504 includes an inverter circuit and one or more power amplifiers that cooperate to generate the alternating current from a direct current source or input. In some examples, the digital frequency reference signal may be generated by the driver circuit 504 or by another circuit. The resonant circuit 506 includes a capacitor 512 and inductor 514. The inductor 514 may represent or include one or more transmitting coils in a charging cell that produced a magnetic flux responsive to the alternating current. The resonant circuit 506 may also be referred to herein as a tank circuit, LC tank circuit, or LC tank, and the voltage 516 measured at an LC node 510 of the resonant circuit 506 may be referred to as the tank voltage.

Passive ping techniques may use the voltage and/or current measured or observed at the LC node 510 to identify the presence of a receiving coil in proximity to the charging pad of a device adapted in accordance with certain aspects disclosed herein. Some conventional wireless charging devices include circuits that measure voltage at the LC node 510 of the resonant circuit 506 or the current in the resonant circuit 506. These voltages and currents may be monitored for power regulation purposes and/or to support communication between devices. According to certain aspects of this disclosure, voltage at the LC node 510 in the wireless transmitter 500 illustrated in FIG. 5 may be monitored to support passive ping techniques that can detect presence of a chargeable device or other object based on response of the resonant circuit 506 to a short burst of energy (the ping) transmitted through the resonant circuit 506.

A passive ping discovery technique may be used to provide fast, low-power discovery. A passive ping may be produced by driving a network that includes the resonant circuit 506 with a fast pulse that includes a small amount of energy. The fast pulse excites the resonant circuit 506 and causes the network to oscillate at its natural resonant frequency until the injected energy decays and is dissipated. The response of a resonant circuit 506 to a fast pulse may be determined in part by the resonant frequency of the resonant LC circuit. A response of the resonant circuit 506 to a passive ping that has initial voltage=$V_0$ may be represented by the voltage VLC observed at the LC node 510, such that:

$$V_{LC} = V_0 e^{-\left(\frac{\omega}{2Q}\right)t} \quad \text{(Eq. 1)}$$

The resonant circuit 506 may be monitored when the controller 502 or another processor is using digital pings to detect presence of objects. A digital ping is produced by driving the resonant circuit 506 for a period of time. The resonant circuit 506 is a tuned network that includes a transmitting coil of the wireless charging device. A receiving device may modulate the voltage or current observed in the resonant circuit 506 by modifying the impedance presented by its power receiving circuit in accordance with signaling state of a modulating signal. The controller 502 or other processor then waits for a data modulated response that indicates that a receiving device is nearby.

Selectively Activating Coils

According to certain aspects disclosed herein, coils in one or more charging cells may be selectively activated to provide an optimal electromagnetic field for charging a compatible device. In some instances, coils may be assigned to charging cells, and some charging cells may overlap other charging cells. The optimal charging configuration may be selected at the charging cell level. In some examples, a charging configuration may include charging cells in a charging surface that are determined to be aligned with or located close to the device to be charged. A controller may activate a single coil or a combination of coils based on the charging configuration which in turn is based on detection of location of the device to be charged. In some implementations, a wireless charging device may have a driver circuit that can selectively activate one or more transmitting coils or one or more predefined charging cells during a charging event.

Figure 6:
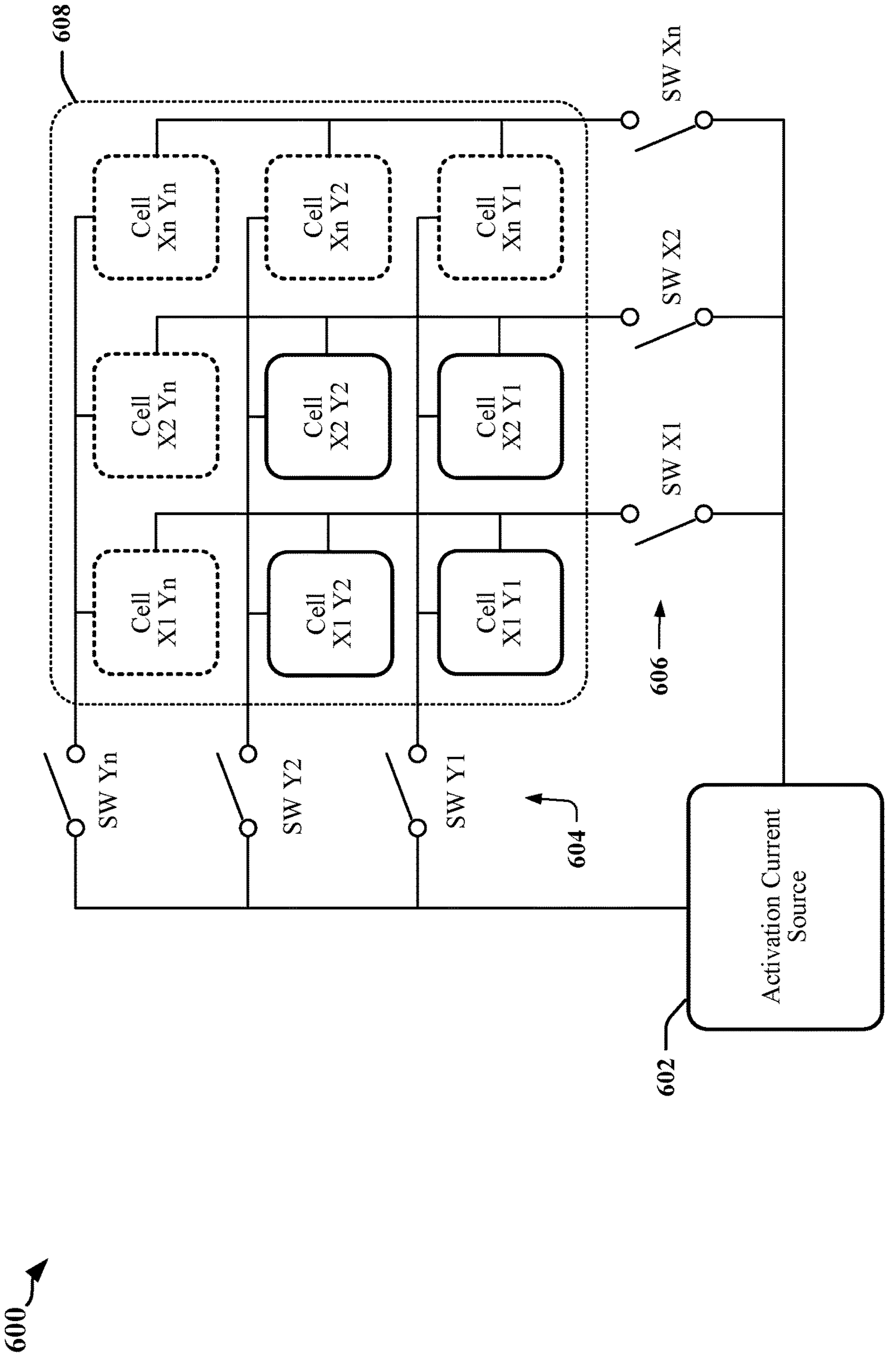
FIG. 6 illustrates a first topology that supports matrix multiplexed switching for use in a wireless charging device adapted in accordance with certain aspects disclosed herein.

FIG. 6 illustrates a first topology 600 that supports matrix multiplexed switching for use in a wireless charging device adapted in accordance with certain aspects disclosed herein. The wireless charging device may select one or more charging cells 100 to charge a receiving device. Charging cells 100 that are not in use can be disconnected from current flow. A relatively large number of charging cells 100 may be used in the honeycomb packaging configuration illustrated in FIGS. 2 and 3, requiring a corresponding number of switches. According to certain aspects disclosed herein, the charging cells 100 may be logically arranged in a matrix 608 having multiple cells connected to two or more switches that enable specific cells to be powered. In the illustrated topology 600, a two-dimensional matrix 608 is provided, where the dimensions may be represented by X and Y coordinates. Each of a first set of switches 606 is configured to selectively couple a first terminal of each cell in a column of cells to a first terminal of a voltage or current source 602 that provides current to activate coils in one or more charging cells during wireless charging. Each of a second set of switches 604 is configured to selectively couple a second terminal of each cell in a row of cells to a second terminal of the voltage or current source 602. A charging cell is active when both terminals of the cell are coupled to the voltage or current source 602.

The use of a matrix 608 can significantly reduce the number of switching components needed to operate a network of tuned LC circuits. For example, N individually connected cells require at least N switches, whereas a two-dimensional matrix 608 having N cells can be operated with $\sqrt{N}$ switches. The use of a matrix 608 can produce significant cost savings and reduce circuit and/or layout complexity. In one example, a 9-cell implementation can be implemented in a 3×3 matrix 608 using 6 switches, saving 3 switches. In another example, a 16-cell implementation can be implemented in a 4×4 matrix 608 using 8 switches, saving 8 switches.

During operation, at least 2 switches are closed to actively couple one coil or charging cell to the voltage or current source 602. Multiple switches can be closed at once in order to facilitate connection of multiple coils or charging cells to the voltage or current source 602. Multiple switches may be closed, for example, to enable modes of operation that drive multiple transmitting coils when transferring power to a receiving device.

Figure 7:
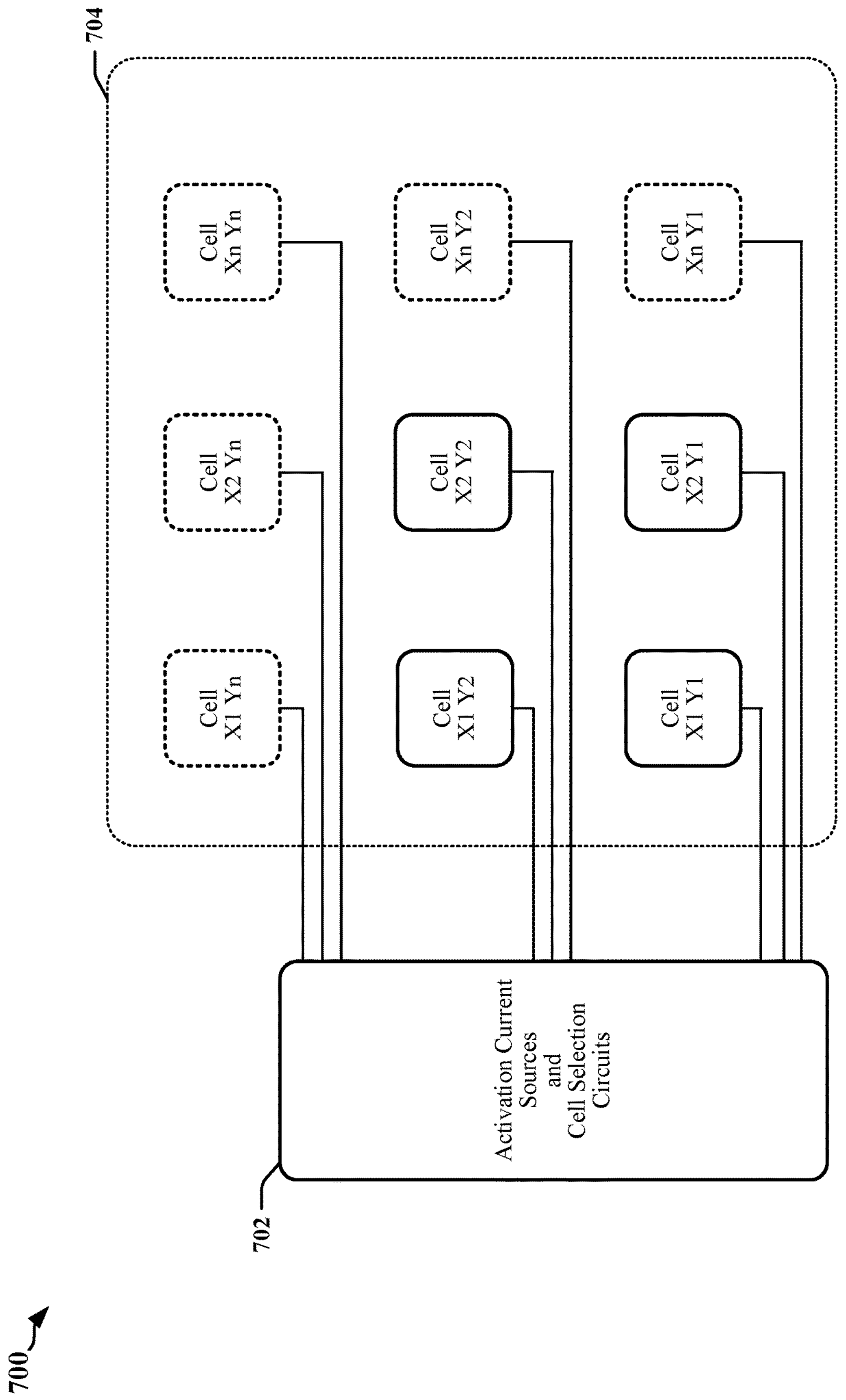
FIG. 7 illustrates a second topology that supports direct current drive in a wireless charging device adapted in accordance with certain aspects disclosed herein.

FIG. 7 illustrates a second topology 700 in which each individual coil or charging cell is directly driven by a driver circuit 702 in accordance with certain aspects disclosed herein. The driver circuit 702 may be configured to select one or more coils or charging cells 100 from a group of coils 704 to charge a receiving device. It will be appreciated that the concepts disclosed here in relation to charging cells 100 may be applied to selective activation of individual coils or stacks of coils. Charging cells 100 that are not in use receive no current flow. A relatively large number of charging cells 100 may be in use and a switching matrix may be employed to drive individual coils or groups of coils. In one example, a first switching matrix may configure connections that define a charging cell or group of coils to be used during a charging event and a second switching matrix may be used to activate the charging cell and/or group of selected coils.

Flux Manipulation in a Multi-Coil Wireless Charger

Figure 8:
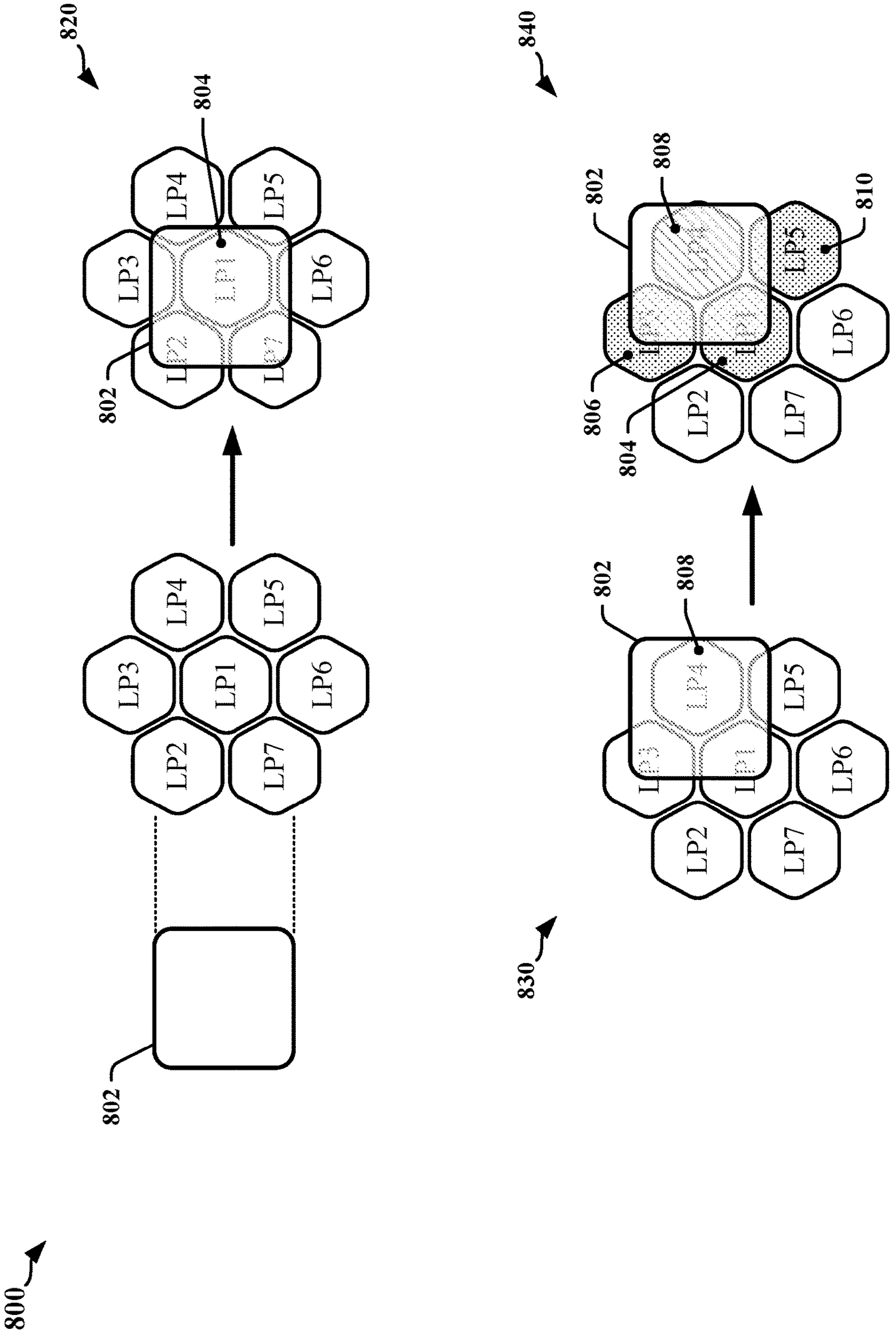
FIG. 8 illustrates first configurations of a charging surface in a wireless charging device and chargeable device in accordance with certain aspects disclosed herein.

FIG. 8 illustrates certain examples 800, 820, 830, 840 of positioning of a chargeable device 802 on a group of charging cells in a charging surface of a wireless charging device. Each charging cell includes at least one charging coil. The chargeable device 802 can be freely positioned on the charging surface. The chargeable device 802 has an area that is comparable to the area occupied by the power transfer area of each charging cell of a charging surface, or to the area occupied by the power transfer area of a constituent inductive charging coil in a charging cell. In the illustrated examples 800, 820, 830, 840, the chargeable device 802 is somewhat larger than a single charging coil 804. Based on the geometry and arrangement of the charging coils 804, 806, 808, 810 the chargeable device 802 can physically cover adjacent charging coils. In the third and fourth examples 830, 840, the chargeable device 802 has been placed such that it substantially overlaps a single charging coil 808 and partially covers multiple other charging coils 804, 806, 810. The chargeable device 802 may receive power from one or more charging coils 804, 806, 808, 810 after it has established its presence.

Figure 9:
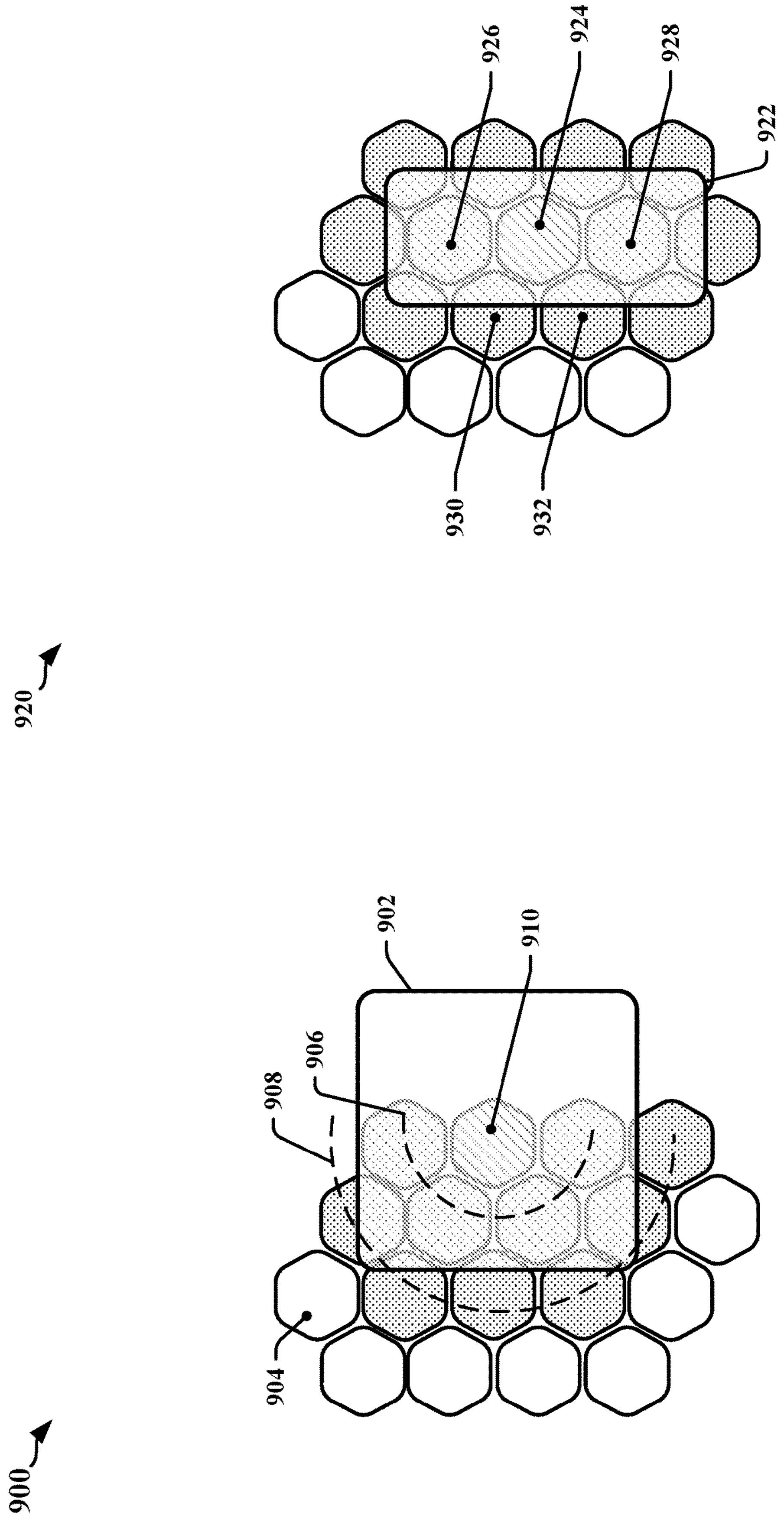
FIG. 9 illustrates second charging configurations on a charging surface in a wireless charging device when a chargeable device is being charged in accordance with certain aspects disclosed herein.

Certain aspects of this disclosure can accommodate charging configurations using multiple adjacent charging cells or charging coils 804, 806, 808, 810. In accordance with certain aspects of this disclosure, any number of charging coils may be available for charging a chargeable device. FIG. 9 illustrates certain aspects of charging configurations 900, 920 that may be defined for a charging surface when a chargeable device 902, 922 is presented for charging or is being charged. The number and location of usable charging cells or charging coils may vary based on the type of an optimally-positioned charging coil 910, 926, the charging contract negotiated between the charging surface and the chargeable device 902, 922, and the topology or configuration of the charging surface. For example, the number and location of usable charging cells or charging coils may be based on the maximum or contracted charging power transmitted through the active coil 910 or potentially through another charging coil 904, or on other factors.

In the first configuration 900, the chargeable device 902 may identify charging cells that are candidates for inclusion in a charging configuration. Each charging cell includes at least one charging coil. In the illustrated example, the chargeable device 902 has been placed such that its center is substantially coaxial with a first charging coil 910. For the purposes of this description, it will be assumed that the center of a first receiving coil 910 within the chargeable device 902 is located at the center of the chargeable device 902. In this example, the wireless charging device may determine that the first charging coil 910 has the strongest coupling with the receiving coil in the chargeable device 902 with respect to the coils in the next bands 906, 908 of charging coils. In one example, the wireless charging device may define the charging configuration as including at least the first charging coil 910. In some examples, the charging configuration may identify one or more charging coils in the first band 906 to be activated during charging procedures.

In the second charging configuration 920, the charging surface may employ sensing techniques that can detect the edges of the chargeable device 922. For example, the outline of the chargeable device 922 can be detected using capacitive sense, inductive sense, pressure, Q-factor measurement or any other suitable device locating technology. In some instances, the outline of the chargeable device 922 can be determined using one or more sensors provided in or on the charging surface. In the illustrated example, the chargeable device 922 has an elongated shape. For the purposes of this description, it will be assumed that the center of a first receiving coil 924 within the chargeable device 922 is located at the center of the chargeable device 922. The wireless charging device may determine that the first charging coil 924 has the strongest coupling with the receiving coil in the chargeable device 922. In one example, the wireless charging device may define the charging configuration as including at least the first charging coil 924. Charging coils 926, 928 that are adjacent to the first receiving coil 924 and that lie under and within the outline of the chargeable device 922 may be included in some charging configurations. Other coils 930, 932 that are adjacent to the first receiving coil 924 and that lie partially under and within the outline of the chargeable device 922 may be defined by some charging configurations to be activated during certain charging procedures.

In some examples, a chargeable device may receive power from two or more active charging cells and/or charging coils. In one example, the chargeable device may have a relatively large footprint with respect to the charging surface and may have multiple receiving coils that can engage multiple charging coils to receive power. In another example, a receiving coil of the chargeable device may be placed substantially equidistant from two or more charging coils and a charging configuration may be defined whereby two or more adjacent charging coils in the charging surface provide power to the chargeable device.

Figure 10:
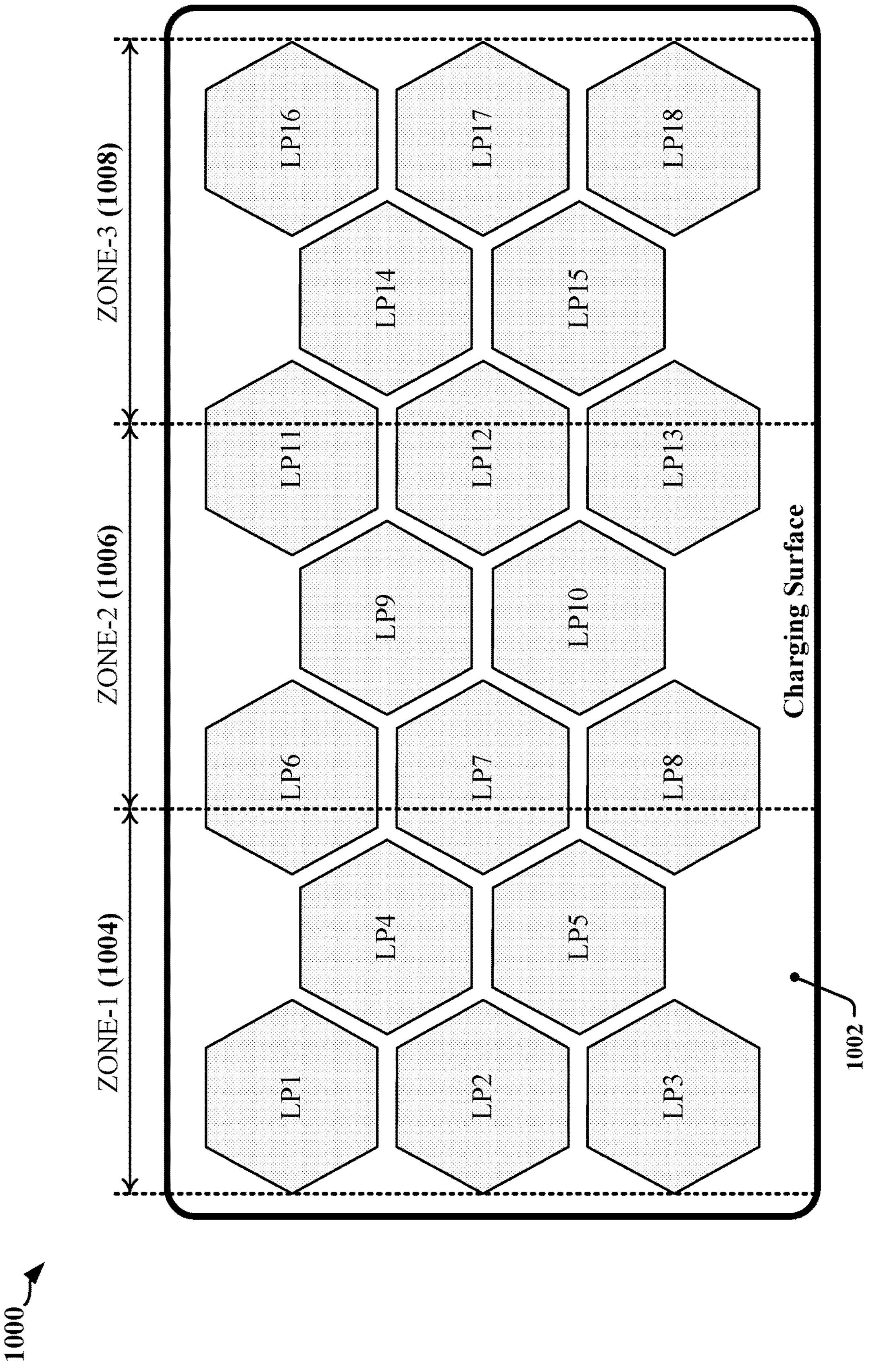
FIG. 10 illustrates a charging surface of a multi-device wireless charger provided in accordance with certain aspects disclosed herein.

FIG. 10 illustrates an example of a wireless charging device 1000 with a zone-based topology provided in accordance with certain aspects of this disclosure. The zone-based topology defines a charging surface 1002 that permits or enables concurrent charging of multiple freely positioned devices. The charging surface 1002 is defined by the location of multiple charging cells (here, labeled LP1-LP18) and the physical shape and size of charging zones 1004, 1006, 1008 within the charging surface 1002 may determine the apportionment of charging cells among the charging zones 1004, 1006, 1008. Each charging cell includes one or more transmitting coils, and each transmitting coil is configured to produce a magnetic field under the influence of a charging current. The magnetic field of the one or more transmitting coils contributes to the magnetic flux within the power transfer area 104 (see FIG. 1) of the associated charging cell.

Each of the charging zones 1004, 1006, 1008 provided on the charging surface 1002 may have a dedicated a driver circuit that provides a charging current to one or more charging cells when a chargeable device is detected within the charging zone 1004, 1006, 1008. The charging cells that receive the charging current may be selected based on detected or measured quality of coupling with a receiving coil of the chargeable device or based on detected proximity between the selected charging cells and the receiving coil. Each charging zone 1004, 1006, 1008 may be operated independently of the other charging zones 1004, 1006, 1008 when charging devices. A chargeable device may be detected and verified by a controller of the wireless charging device 1000, and the controller may define a charging configuration that identifies one or more charging cells to transmit power to the chargeable device. The charging configuration may also configure and enable a driver circuit associated with the charging zone 1004, 1006, 1008 in which the identified charging cells are located.

In the illustrated example, the charging cells are arranged according to a honeycomb packaging configuration and the charging zones 1004, 1006, 1008 divide the charging surface 1002 into three substantially equal areas. Each charging zone 1004, 1006, 1008 covers a subset of the charging coils and it can be seen that some charging cells straddle two of the charging zones 1004, 1006, 1008. A four-zone division of the charging surface 1002 may provide a more uniform division of charging cells, in which the first zone would be serviced by LP1-LP5, the second zone would be serviced by LP6-LP10, the third zone would be serviced by LP11-LP15 and the fourth zone would be serviced by LP16-LP17 and two additional charging cells. The four-zone charging surface 1002 would require additional driver and control circuits and would increase the area of the charging surface 1002, decrease the area of the charging cells, or provide a fourth zone with only three charging cells (LP16-LP18). These different configurations for a charging surface 1002 may be usable in certain applications but can cause other issues associated with alignment of chargeable devices within a charging zone, such that a chargeable device may occupy two zones to the extent that one of the zones becomes unusable for charging a different chargeable device. The additional driver and control circuits can also increase manufacturing costs.

Figure 11:
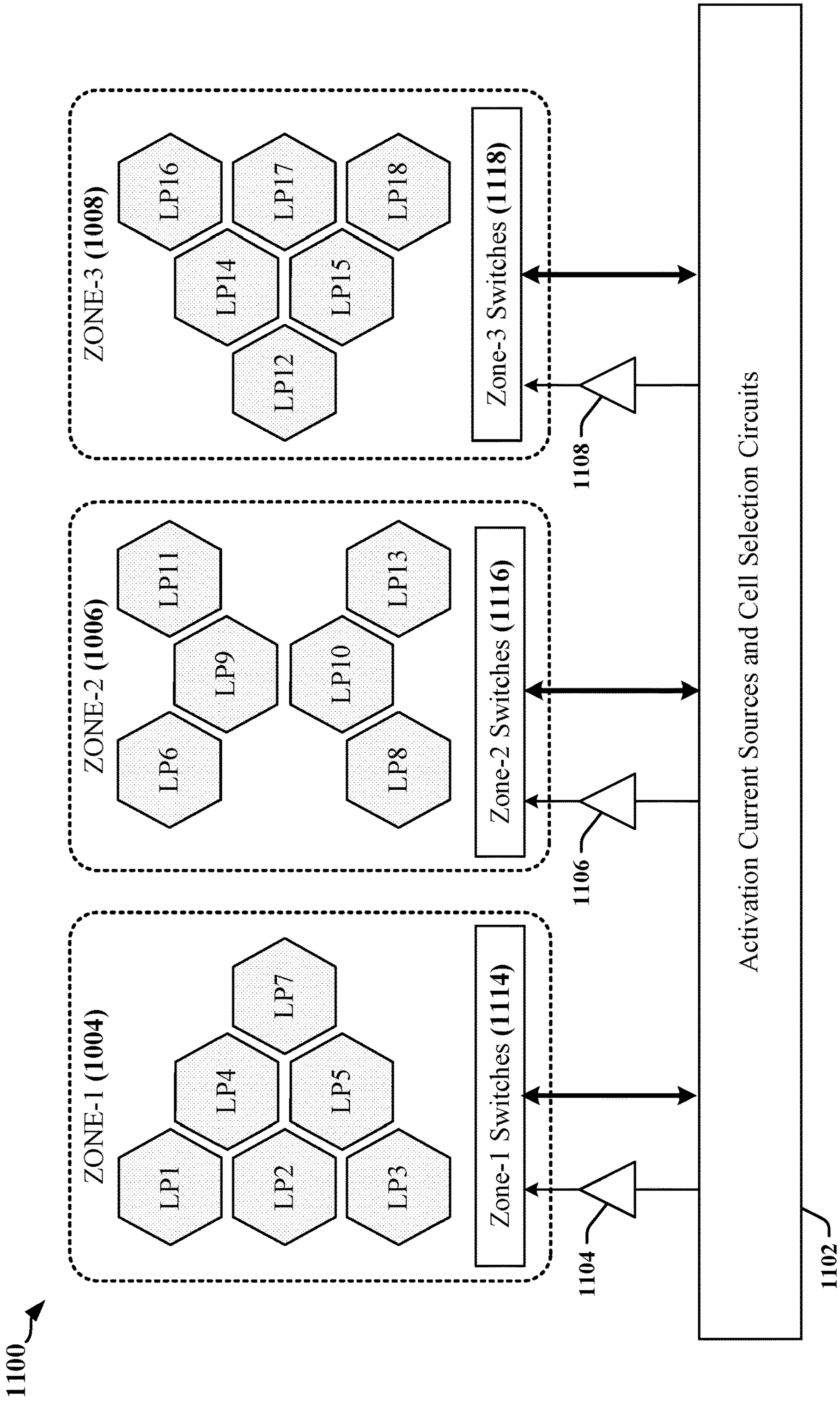
FIG. 11 illustrates of a configuration of charging cells in a wireless charging device that corresponds to the wireless charging device of FIG. 10.

FIG. 11 illustrates of a configuration of charging cells in a wireless charging device 1100 that corresponds to the wireless charging device 1000 of FIG. 10. The 18 charging cells at the charging surface 1002 of the wireless charging device 1000 are divided evenly for allocation among three charging zones 1004, 1006, 1008. In this configuration, each charging zone 1004, 1006, 1008 includes six charging cells that are physically located at least partially within the bounds of the corresponding charging zone 1004, 1006, 1008. In some instances, a charging cell may be partially located within the bounds of two charging zones 1004, 1006, 1008.

The charging cells in each charging zone 1004, 1006 or 1008 are coupled to a driver 1104, 1106 or 1108 provided for the charging zone 1004, 1006 or 1008 through a corresponding switching circuit 1114, 1116, 1118. The switching circuit 1114, 1116, 1118 may be controlled by a processing circuit 1102 that manages operations of the wireless charging device. The processing circuit 1102 may include one or more processors, controllers or sequencers that can be configured to detect presence of a chargeable device, define a charging configuration for charging the device and configure the driver 1104, 1106 or 1108 and switching circuit 1114, 1116 or 1118 selected to charge the chargeable device.

Figure 12:
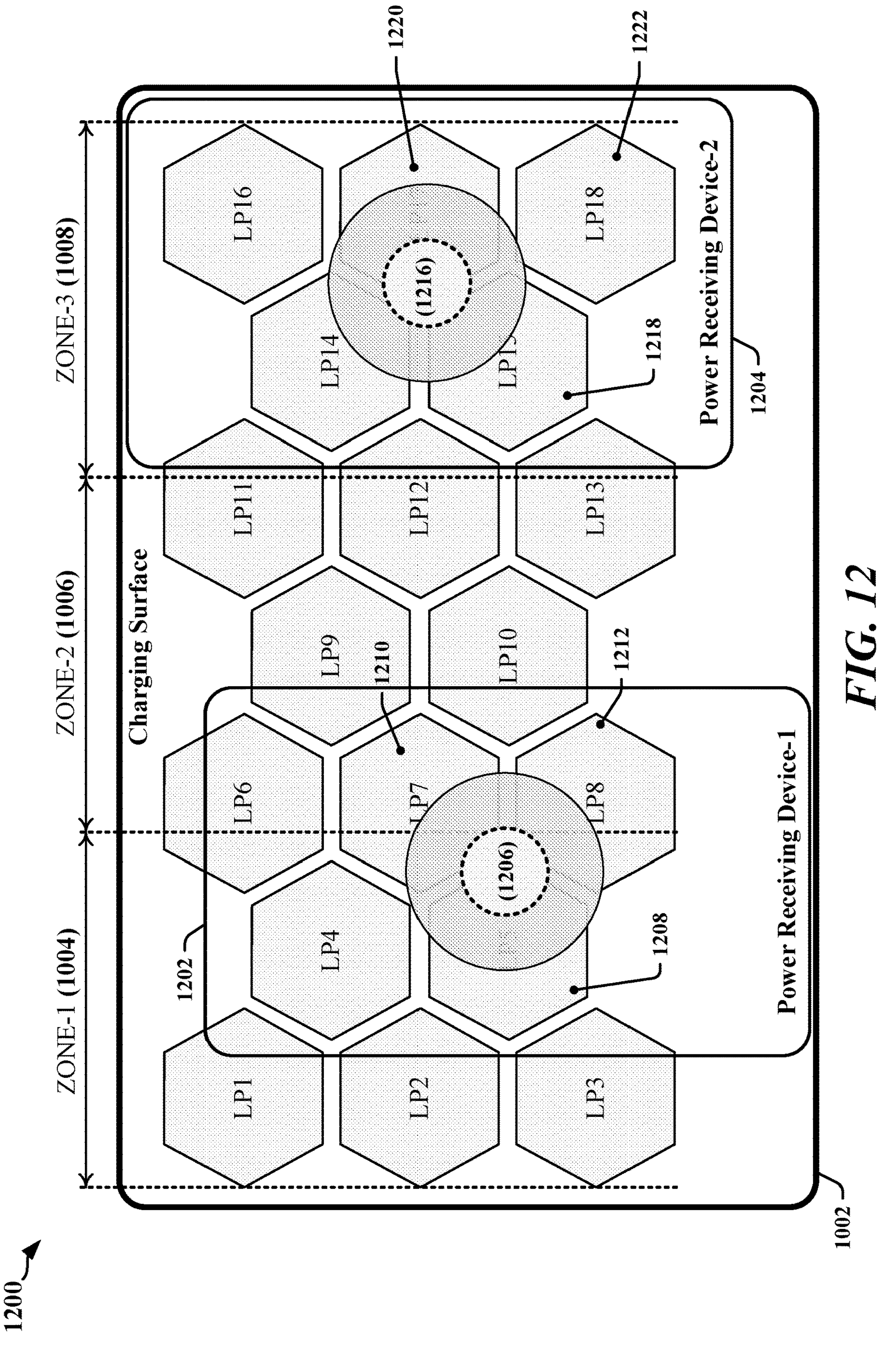
FIG. 12 is first flowchart illustrating an example of a method for operating a wireless charging device that includes or implements a charging surface in accordance with certain aspects disclosed herein.

FIG. 12 illustrates an example 1200 of the use of the charging surface 1002 of FIG. 10 to charge two receiving devices 1202, 1204. In the illustrated example, each receiving device 1202, 1204 overlaps multiple charging cells. Each charging cell can include one or more transmitting coils. The placement of the first receiving device 1202 causes a receiving coil 1206 of the first receiving device 1202 to overlap or be adjacent to three charging cells 1208, 1210, 1212 of the charging surface 1002. The placement of the second receiving device 1204 causes a receiving coil 1216 of the second receiving device 1204 to overlap or be adjacent to three charging cells 1218, 1220, 1222 all located within the third charging zone 1008. The charging cells 1208, 1210, 1212 adjacent to the receiving coil 1206 of the first receiving device 1202 lie within two different charging zones 1004, 1006. Two charging cells 1208, 1210 are included in the first charging zone 1004 (see FIG. 11), while the other charging cell 1212 is included in the second charging zone 1006. In this example, it may be preferable or desirable to include more than one of the adjacent charging cells 1208, 1210, 1212 in a charging configuration for the first receiving device 1202. In some examples, the driver circuits associated with both the first charging zone 1004 and the second charging zone 1006 would need to be engaged to support a charging configuration for the first receiving device 1202 that uses charging cells 1208, 1210, 1212 from two different charging zones 1004, 1006.

Certain aspects of this disclosure provide swinging coils which may be assigned to more than one charging zone 1004, 1006 or 1008 in a charging configuration. For the purposes of this description, each charging cell at a charging surface may include a power transmitting coil configured to produce a magnetic field within a power transfer area associated with a charging cell. The power transmitting coil may include a single transmitting coil or multiple transmitting coils operated as a single transmitting coil.

In one example that is based on the allocation of charging cells illustrated in FIG. 11, the placement of the first receiving device 1202 illustrated in FIG. 12 can be accommodated by reassigning the charging cell 1212 included in the second charging zone 1006 to the first charging zone 1004. The reassignment of the charging cell 1212 may be accomplished by coupling the charging coil 1212 to the driver circuit 1104 provided, assigned, configured or allocated to the first charging zone 1004. In another example, the placement illustrated in FIG. 12 can be accommodated by reassigning the charging cells 1208, 1210 that are included in the first charging zone 1004 (see FIG. 11) to the second charging zone 1006. The reassignment of the charging cells 1208, 1210 may be accomplished by coupling the charging cells 1208, 1210 to the driver circuit 1106 provided, assigned, configured or allocated to the second charging zone 1006. In one aspect of this disclosure, each charging cell 1208, 1210, 1212 is assigned a default charging zone 1004, 1006, 1008. In one aspect of this disclosure, reassignment to a different charging zone 1004, 1006, 1008 is temporary and the reassigned charging cell 1208, 1210, 1212 is returned to its default charging zone 1004, 1006, 1008 upon completion of a charging procedure.

Figure 13:
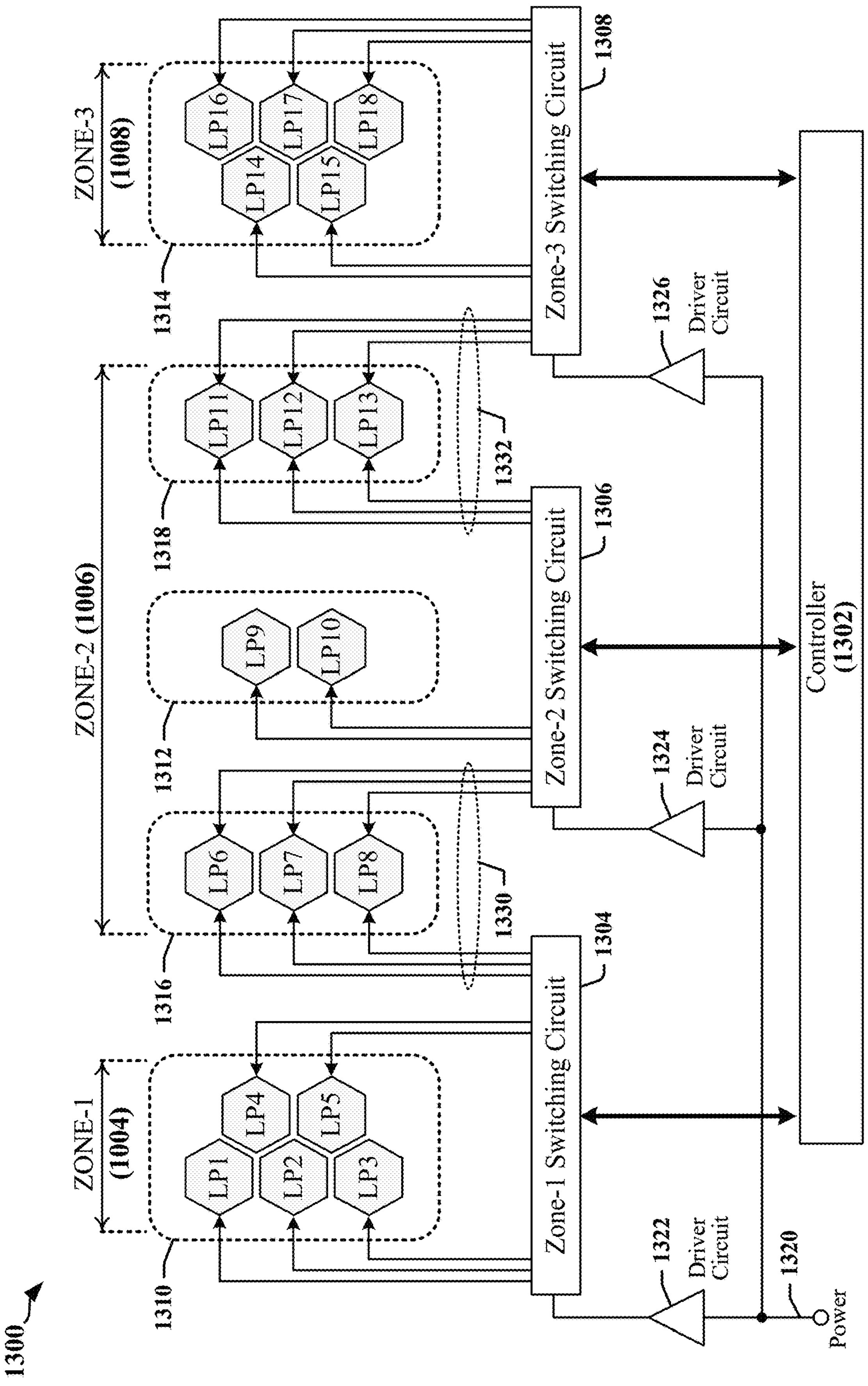
FIG. 13 illustrates an example of a charging system that supports swinging cells in accordance with certain aspects of this disclosure.

FIG. 13 illustrates an example of a charging system 1300 that supports swinging coils in accordance with certain aspects of this disclosure. In some examples, a swinging coil can refer to one of multiple transmitting coils in a charging cell that can be reassigned to a different charging cell or to a different charging zone 1004, 1006 or 1008. For the purposes of this disclosure, each charging cell in FIG. 13 may be considered to operate as a single transmitting coil and the terms "coil" and "cell" may be interchangeable when used in relation to FIG. 13. In one example, a charging cell may be considered to include a single transmitting coil when multiple transmitting coils associated with the charging cell are coupled such that they behave as a single transmitting coil.

In the charging system 1300 of FIG. 13, each of the 18 charging cells at the charging surface 1002 of FIG. 10 are assigned to a fixed or default charging zone 1004, 1006 or 1008. Each charging zone 1004, 1006, 1008 includes a set of fixed coils 1310, 1312, 1314. Two sets of swinging coils 1316, 1318 are assigned to the second charging zone 1006 by default. The transmitting coils in the first set of swinging coils 1316 may be reassigned from the second charging zone 1006 to the first charging zone 1004 and the transmitting coils in the second set of swinging coils 1318 may be reassigned from the second charging zone 1006 to the third charging zone 1008. In some examples, reassignment involves reassigning all transmitting coils in a set of swinging coils 1316, 1318 as a unit to another charging zone 1004, 1006 or 1008. In other examples, transmitting coils in the sets of swinging coils 1316, 1318 can be individually reassigned to another charging zone 1004, 1006 or 1008. In one example related to the placement of the first receiving device 1202 in FIG. 12, the swinging coils associated with charging cells LP7 and LP8 may be reassigned to the first charging zone 1004 while the swinging coils associated with charging cell LP6 remains assigned to the second charging zone 1004.

A switching circuit 1304, 1306, 1308 can be configured to couple the transmitting coils in each set of fixed coils 1310, 1312, 1314 to a predefined or preconfigured driver circuit 1322, 1324 or 1326 associated with the corresponding charging zone 1004, 1006, 1008.

The transmitting coils in each set of swinging coils 1316, 1318 can be coupled to a first driver circuit 1322, 1324 or 1326 through a switching circuit 1304, 1306, 1308 associated with the default charging zone 1004, 1006, 1008 and can be coupled to a second driver circuit 1322, 1324 or 1326 through switching circuits 1304, 1306, 1308 associated with one other charging zone 1004, 1006 or 1008. A controller 1302 may configure the switching circuits 1304, 1306, 1308 to implement a charging configuration.

In one example, a charging configuration defined for charging the first receiving device 1202 in FIG. 12 causes charging cells LP7 and LP8 to be reassigned to the first charging zone 1004 while charging cell LP6 remains assigned to the second charging zone 1004. The controller 1302 configures the switching circuit 1304 for the first charging zone 1004 to provide a charging current to charging cells LP5, LP7 and LP8. The charging current may be provided by the driver circuit 1322 provided for the first charging zone 1004. In some instances, the driver circuit 1322 may be configurable to provide currents of different magnitude or phase to different charging cells or to different transmitting coils in a charging cell. In some instances, the driver circuit 1322 associated with the first charging zone 1004 may be configurable to drive other charging cells when a second chargeable device is detected within the first charging zone 1004.

The switching circuits 1304, 1306, 1308 may be controlled by a processing circuit that manages charging operations of the wireless charging device. The processing circuit may include one or more processors, controllers 1302 or sequencers that can be configured to detect presence of a chargeable device, define a charging configuration for charging the device and configure the driver circuits 1322, 1324 or 1326 and switching circuits 1304, 1306, 1308 corresponding to the charging zone 1004, 1006 or 1008 selected to charge the chargeable device. Each of the switching circuits 1304, 1306, 1308 may be configured to cause a charging current to flow through a coil in a charging cell identified in the charging configuration. In one example, the switching circuits 1304, 1306, 1308 may couple terminals the coil in the identified charging cell to a source and sink of the current. In another example, the switching circuits 1304, 1306, 1308 may couple a terminal of the coil in the identified charging cell to a source of the current, another terminal of the coil being coupled to a ground or common rail. In another example, the switching circuits 1304, 1306, 1308 may couple a terminal of the coil in the identified charging cell to a sink of the current, another terminal of the coil being coupled to a power rail.

In FIG. 13, the charging coils in the sets of swinging coils 1316, 1318 are shown as having separate couplings 1330, 1332 to two of the switching circuits 1304, 1306, 1308. In many examples, outputs of pairs of the switching circuits 1304, 1306, 1308 coupled to the same swinging coil can be connected in parallel at the switching circuit, minimizing the number of traces on a printed circuit board that includes the transmitting coils of the various charging cells.

In some examples, the switching circuits 1304, 1306, 1308 may include or be based on the architecture of the driver circuit 702 illustrated in FIG. 7 or the matrix 608 of switches illustrated in FIG. 6. In some examples, the switching circuits 1304, 1306, 1308 may be combined into a single circuit that includes a combination of the driver circuit 702 illustrated in FIG. 7 and the matrix 608 of switches illustrated in FIG. 6.

Figure 14:
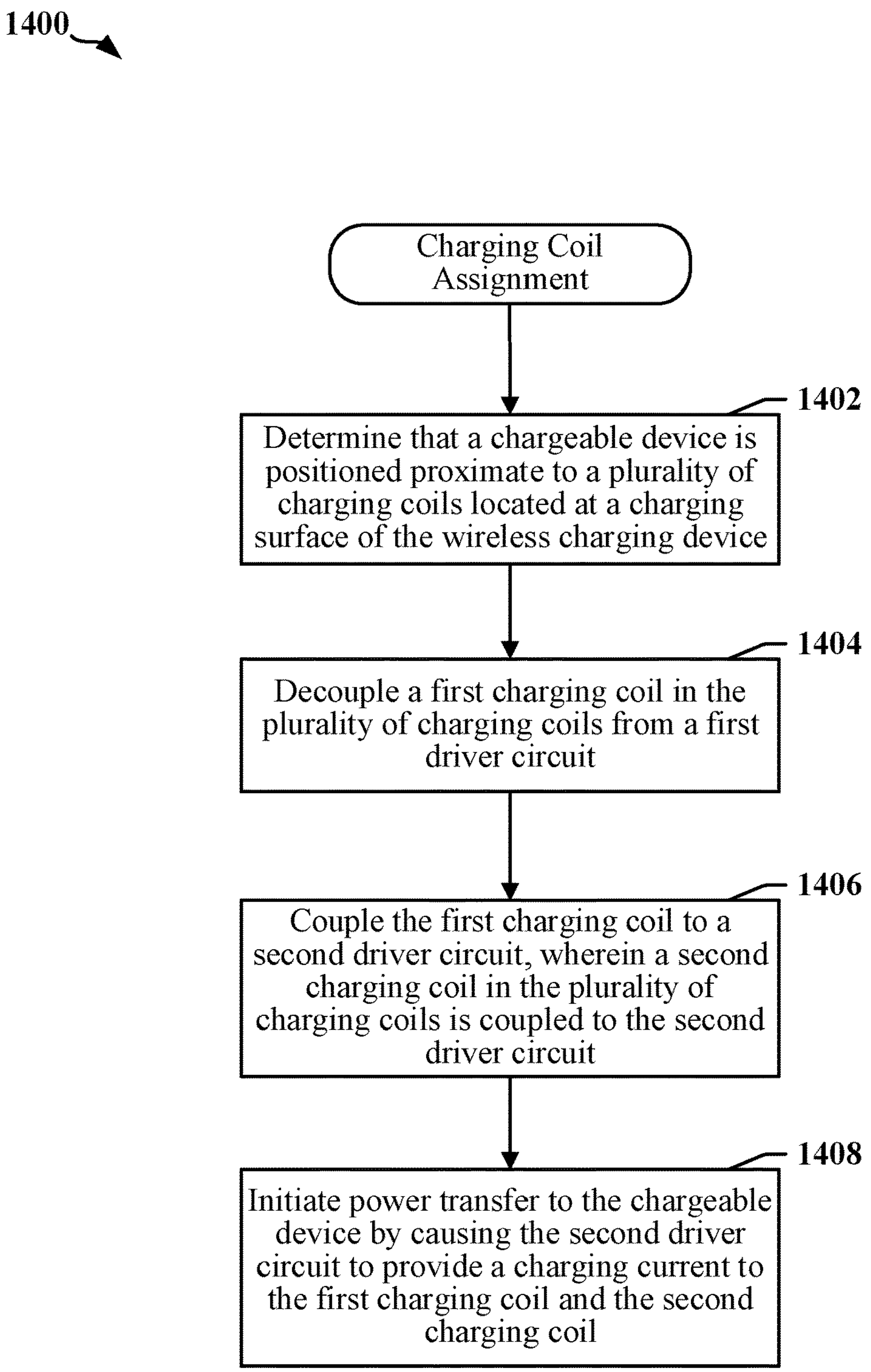
FIG. 14 is second flowchart illustrating an example of a method for operating a wireless charging device that includes or implements a charging surface in accordance with certain aspects disclosed herein.

FIG. 14 is flowchart 1400 illustrating one example of a method for operating a wireless charging device that includes or implements a charging surface. The method may be performed by a controller provided in the wireless charging apparatus. At block 1402, the controller may that a chargeable device is positioned proximate to a plurality of charging coils located at a charging surface of the wireless charging device. At block 1404, the controller may decouple a first charging coil in the plurality of charging coils from a first driver circuit. At block 1406, the controller may couple the first charging coil to a second driver circuit. A second charging coil in the plurality of charging coils may be coupled to the second driver circuit. At block 1408, the controller may initiate power transfer to the chargeable device by causing the second driver circuit to provide a charging current to the first charging coil and the second charging coil.

In various implementations, at least two zones are defined on the charging surface. The first driver circuit may be configured to provide current for charging devices through a first zone. The second driver circuit may be configured to provide current for charging devices through a second zone. The first charging coil may be at least partially physically located within the first zone. The second charging coil may be at least partially physically located within the second zone. Each zone includes at least one coil assigned from the plurality of charging coils. A coil assigned to a zone may be coupled by default to the zone. For example, a charging coil may be automatically recoupled to a driver of its assigned zone upon completion of charging a chargeable device while coupled to a driver in a different zone. The first charging coil may be assigned to the first zone. The second charging coil may be assigned to the second zone. In one example, the chargeable device is positioned such that it spans the first zone and the second zone.

In some implementations, the controller may decouple the first charging coil from the second driver circuit when power transfer to the chargeable device has been terminated, and couple the first charging coil to the first driver circuit after decoupling the first charging coil from the second driver circuit.

Example of a Processing Circuit

Figure 15:
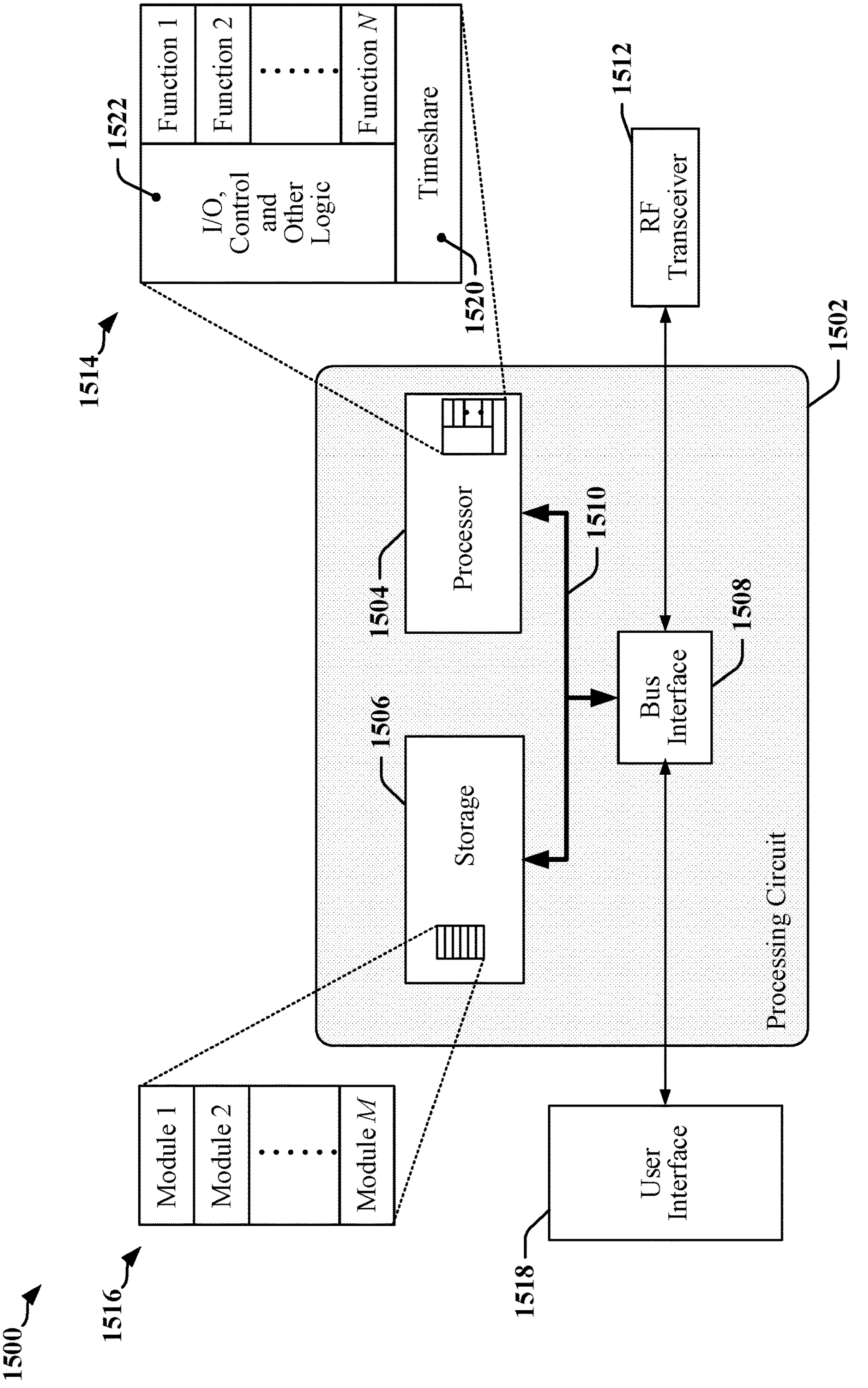
FIG. 15 illustrates one example of an apparatus employing a processing circuit that may be adapted according to certain aspects disclosed herein.

FIG. 15 illustrates an example of a hardware implementation for an apparatus 1500 that may be incorporated in a wireless charging device or in a receiving device that enables a battery to be wirelessly charged. In some examples, the apparatus 1500 may perform one or more functions disclosed herein. In accordance with various aspects of the disclosure, an element, or any portion of an element, or any combination of elements as disclosed herein may be implemented using a processing circuit 1502. The processing circuit 1502 may include one or more processors 1504 that are controlled by some combination of hardware and software modules. Examples of processors 1504 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1504 may include specialized processors that perform specific functions, and that may be configured, augmented or controlled by one of the software modules 1516. The one or more processors 1504 may be configured through a combination of software modules 1516 loaded during initialization, and further configured by loading or unloading one or more software modules 1516 during operation.

In the illustrated example, the processing circuit 1502 may be implemented with a bus architecture, represented generally by the bus 1510. The bus 1510 may include any number of interconnecting buses and bridges depending on the specific application of the processing circuit 1502 and the overall design constraints. The bus 1510 links together various circuits including the one or more processors 1504, and storage 1506. Storage 1506 may include memory devices and mass storage devices and may be referred to herein as computer-readable media and/or processor-readable media. The storage 1506 may include transitory storage media and/or non-transitory storage media.

The bus 1510 may also link various other circuits such as timing sources, timers, peripherals, voltage regulators, and power management circuits. A bus interface 1508 may provide an interface between the bus 1510 and one or more transceivers 1512. In one example, a transceiver 1512 may be provided to enable the apparatus 1500 to communicate with a charging or receiving device in accordance with a standards-defined protocol. Depending upon the nature of the apparatus 1500, a user interface 1518 (e.g., keypad, display, speaker, microphone, joystick) may also be provided, and may be communicatively coupled to the bus 1510 directly or through the bus interface 1508.

A processor 1504 may be responsible for managing the bus 1510 and for general processing that may include the execution of software stored in a computer-readable medium that may include the storage 1506. In this respect, the processing circuit 1502, including the processor 1504, may be used to implement any of the methods, functions and techniques disclosed herein. The storage 1506 may be used for storing data that is manipulated by the processor 1504 when executing software, and the software may be configured to implement any one of the methods disclosed herein.

One or more processors 1504 in the processing circuit 1502 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1506 or in an external computer-readable medium. The external computer-readable medium and/or storage 1506 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1506 may also include, by way of example, a carrier wave, a transmission line, and any other suitable medium for transmitting software and/or instructions that may be accessed and read by a computer. Computer-readable medium and/or the storage 1506 may reside in the processing circuit 1502, in the processor 1504, external to the processing circuit 1502, or be distributed across multiple entities including the processing circuit 1502. The computer-readable medium and/or storage 1506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1506 may maintain and/or organize software in loadable code segments, modules, applications, programs, etc., which may be referred to herein as software modules 1516. Each of the software modules 1516 may include instructions and data that, when installed or loaded on the processing circuit 1502 and executed by the one or more processors 1504, contribute to a run-time image 1514 that controls the operation of the one or more processors 1504. When executed, certain instructions may cause the processing circuit 1502 to perform functions in accordance with certain methods, algorithms and processes described herein.

Some of the software modules 1516 may be loaded during initialization of the processing circuit 1502, and these software modules 1516 may configure the processing circuit 1502 to enable performance of the various functions disclosed herein. For example, some software modules 1516 may configure internal devices and/or logic circuits 1522 of the processor 1504, and may manage access to external devices such as a transceiver 1512, the bus interface 1508, the user interface 1518, timers, mathematical coprocessors, and so on. The software modules 1516 may include a control program and/or an operating system that interacts with interrupt handlers and device drivers, and that controls access to various resources provided by the processing circuit 1502. The resources may include memory, processing time, access to a transceiver 1512, the user interface 1518, and so on.

One or more processors 1504 of the processing circuit 1502 may be multifunctional, whereby some of the software modules 1516 are loaded and configured to perform different functions or different instances of the same function. The one or more processors 1504 may additionally be adapted to manage background tasks initiated in response to inputs from the user interface 1518, the transceiver 1512, and device drivers, for example. To support the performance of multiple functions, the one or more processors 1504 may be configured to provide a multitasking environment, whereby each of a plurality of functions is implemented as a set of tasks serviced by the one or more processors 1504 as needed or desired. In one example, the multitasking environment may be implemented using a timesharing program 1520 that passes control of a processor 1504 between different tasks, whereby each task returns control of the one or more processors 1504 to the timesharing program 1520 upon completion of any outstanding operations and/or in response to an input such as an interrupt. When a task has control of the one or more processors 1504, the processing circuit is effectively specialized for the purposes addressed by the function associated with the controlling task. The timesharing program 1520 may include an operating system, a main loop that transfers control on a round-robin basis, a function that allocates control of the one or more processors 1504 in accordance with a prioritization of the functions, and/or an interrupt driven main loop that responds to external events by providing control of the one or more processors 1504 to a handling function.

In one implementation, the apparatus 1500 includes or operates as a wireless charging apparatus that provides a charging surface with multiple charging cells and charging zones. The wireless charging apparatus has a battery charging power source coupled to a charging circuit, a plurality of charging coils, a plurality of driver circuits and a controller, which may be included in one or more processors 1504. The plurality of charging coils may be configured to provide a charging surface. Each driver circuit may be configured to independently provide a charging current to one or more charging coils. At least one charging coil may be configured to generate an electromagnetic field through a power transfer area of a charging cell.

The controller may be configured to determine that a chargeable device is positioned proximate to a plurality of charging coils provided in a charging surface, decouple a first charging coil in the plurality of charging coils from a first driver circuit, couple the first charging coil to a second driver circuit while a second charging coil in the plurality of charging coils is coupled to the second driver circuit, and configure the charging current supplied by the second driver circuit to cause the first charging coil and the second charging coil to transfer a desired power level to the chargeable device.

In various implementations, at least two zones are defined on the charging surface. The first driver circuit may be configured to provide current for charging devices through a first zone. The second driver circuit may be configured to provide current for charging devices through a second zone. The first charging coil may be at least partially physically located within the first zone. The second charging coil may be at least partially physically located within the second zone. The first charging coil may be assigned to the first zone. The second charging coil may be assigned to the second zone. In one example, the chargeable device is positioned such that it spans the first zone and the second zone.

The wireless charging device may have a first switching circuit responsive to the controller and operable to couple the first charging coil to the first driver circuit and a second switching circuit responsive to the controller and operable to couple the first charging coil and the second charging coil to the second driver circuit. In some implementations, the controller may decouple the first charging coil from the second driver circuit when power transfer to the chargeable device has been terminated, and couple the first charging coil to the first driver circuit after decoupling the first charging coil from the second driver circuit.

In some implementations, the storage 1506 maintains instructions and information where the instructions are configured to cause the one or more processors 1504 to determine that a chargeable device is positioned proximate to a charging coil provided by a charging surface, provide a charging current to the charging coil, and exclude a plurality of adjacent coils from operation while the current is provided to the charging coil. Each of the adjacent coils may be located within the charging surface adjacent to the charging coil.

In some implementations, the instructions are configured to cause the one or more processors 1504 to determine that a chargeable device is positioned proximate to a plurality of charging coils provided in a charging surface, decouple a first charging coil in the plurality of charging coils from a first driver circuit, couple the first charging coil to a second driver circuit while a second charging coil in the plurality of charging coils is coupled to the second driver circuit, and initiate power transfer to the chargeable device by causing the second driver circuit to provide a charging current to the first charging coil and the second charging coil.

In various implementations, at least two zones are defined on the charging surface. The first driver circuit may be configured to provide current for charging devices through a first zone. The second driver circuit may be configured to provide current for charging devices through a second zone. The first charging coil may be at least partially physically located within the first zone. The second charging coil may be at least partially physically located within the second zone. The first charging coil may be assigned to the first zone. The second charging coil may be assigned to the second zone. In one example, the chargeable device is positioned such that it spans the first zone and the second zone.

In some implementations, the instructions are configured to cause the one or more processors 1504 to decouple the first charging coil from the second driver circuit when power transfer to the chargeable device has been terminated, and couple the first charging coil to the first driver circuit after decoupling the first charging coil from the second driver circuit.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for operating a wireless charging device, comprising:

determining that a chargeable device is positioned proximate to a plurality of charging coils located at a charging surface of the wireless charging device;

decoupling a first charging coil in the plurality of charging coils from a first driver circuit of a plurality of driver circuits;

coupling the first charging coil to a second driver circuit of the plurality of driver circuits after decoupling the first charging coil from the first driver circuit, wherein a second charging coil in the plurality of charging coils is coupled to the second driver circuit; and initiating power transfer to the chargeable device by causing the second driver circuit to provide a charging current to the first charging coil and the second charging coil, wherein at least two zones are defined on the charging surface, wherein the first driver circuit is configured to provide current for charging devices through a first zone, and wherein the second driver circuit is configured to provide current for charging devices through a second zone.

2. The method of claim 1, wherein each zone includes at least one coil assigned from the plurality of charging coils.

3. The method of claim 1, wherein the first charging coil is at least partially physically located within the first zone, and wherein the second charging coil is at least partially physically located within the second zone.

4. The method of claim 1, wherein the first charging coil is assigned to the first zone, and wherein the second charging coil is assigned to the second zone.

5. The method of claim 1, wherein the chargeable device is positioned such that it spans the first zone and the second zone.

6. The method of claim 1, further comprising:

decoupling the first charging coil from the second driver circuit when power transfer to the chargeable device has been terminated;

coupling the first charging coil to the first driver circuit after decoupling the first charging coil from the second driver circuit; and initiating power transfer using the first driver circuit to provide charging current to the first charging coil after decoupling the first charging coil from the second driver circuit.

7. A wireless charging device, comprising:

a plurality of charging coils located at a charging surface of the wireless charging device;

a plurality of driver circuits, each configured to supply a charging current to one or more of the plurality of charging coils; and a controller configured to:

determine that a chargeable device is positioned proximate to a first charging coil in the plurality of charging coils;

decouple the first charging coil in the plurality of charging coils from a first driver circuit;

couple the first charging coil to a second driver circuit, wherein a second charging coil in the plurality of charging coils is coupled to the second driver circuit; and configure the charging current supplied by the second driver circuit to cause the first charging coil and the second charging coil to transfer a desired power level to the chargeable device, wherein at least two zones are defined on the charging surface, wherein the first driver circuit is configured to provide current for charging devices through a first zone, and wherein the second driver circuit is configured to provide current for charging devices through a second zone.

8. The wireless charging device of claim 7, wherein each zone includes at least one charging coil assigned from the plurality of charging coils.

9. The wireless charging device of claim 7, wherein the first charging coil is at least partially physically located within the first zone, and wherein the second charging coil is at least partially physically located within the second zone.

10. The wireless charging device of claim 7, wherein the first charging coil is assigned by default to the first zone, and wherein the second charging coil is assigned by default to the second zone.

11. The wireless charging device of claim 7, wherein the chargeable device is positioned such that it spans the first zone and the second zone.

12. The wireless charging device of claim 7, further comprising:

a first switching circuit responsive to the controller and operable to couple the first charging coil to the first driver circuit; and a second switching circuit responsive to the controller and operable to couple the first charging coil and the second charging coil to the second driver circuit.

13. A processor readable storage medium, comprising code for:

determining that a chargeable device is positioned proximate to a plurality of charging coils located at a charging surface of a charging device;

decoupling a first charging coil in the plurality of charging coils from a first driver circuit of a plurality of driver circuits;

coupling the first charging coil to a second driver circuit of the plurality of driver circuits after decoupling the first charging coil from the first driver circuit, wherein a second charging coil in the plurality of charging coils is coupled to the second driver circuit; and initiating power transfer to the chargeable device by causing the second driver circuit to provide a charging current to the first charging coil and the second charging coil, wherein at least two zones are defined on the charging surface, wherein the first driver circuit is configured to provide current for charging devices through a first zone, and wherein the second driver circuit is configured to provide current for charging devices through a second zone.

14. The processor readable storage medium of claim 13, wherein the first charging coil is at least partially physically located within the first zone, and wherein the second charging coil is at least partially physically located within the second zone.

15. The processor readable storage medium of claim 13, wherein each zone includes at least one coil assigned from the plurality of charging coils, wherein the first charging coil is assigned to the first zone, and wherein the second charging coil is assigned to the second zone.

16. The processor readable storage medium of claim 13, wherein the chargeable device is positioned such that it spans the first zone and the second zone.

17. The processor readable storage medium of claim 13, further comprising code for:

decoupling the first charging coil from the second driver circuit when power transfer to the chargeable device has been terminated;

coupling the first charging coil to the first driver circuit after decoupling the first charging coil from the second driver circuit; and initiating power transfer using the first driver circuit to provide charging current to the first charging coil after decoupling the first charging coil from the second driver circuit.

* * * * *